United States Patent
Gao et al.

(10) Patent No.: US 11,453,753 B2
(45) Date of Patent: Sep. 27, 2022

(54) METHOD FOR ACTIVATING POLYTETRAFLUOROETHYLENE AND METHOD FOR WASTEWATER TREATMENT, ELECTROGENESIS, AND HYDROGEN PRODUCTION USING POLYTETRAFLUOROETHYLENE

(71) Applicant: Nanjing University, Nanjing (CN)

(72) Inventors: Guandao Gao, Nanjing (CN); Yanfeng Wang, Nanjing (CN); Liangtao Pu, Nanjing (CN); Jie Ding, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 227 days.

(21) Appl. No.: 16/903,336

(22) Filed: Jun. 16, 2020

(65) Prior Publication Data

US 2021/0206925 A1 Jul. 8, 2021

Related U.S. Application Data (63) Continuation-in-part of application No. PCT/CN2020/082740, filed on Apr. 1, 2020.

(30) Foreign Application Priority Data

Jan. 7, 2020 (CN) .......................... 202010014724.7

(51) Int. Cl.
*C08J 3/28* (2006.01)
*C08J 5/18* (2006.01)
*C02F 1/72* (2006.01)
*C02F 1/70* (2006.01)
*C02F 1/68* (2006.01)

(52) U.S. Cl.
CPC ................... *C08J 3/28* (2013.01); *C02F 1/68* (2013.01); *C02F 1/70* (2013.01); *C02F 1/72* (2013.01); *C08J 5/18* (2013.01); *C08J 2327/18* (2013.01)

(58) Field of Classification Search
CPC ... C08J 3/28; C08J 5/18; C08J 2327/18; C08J 7/123; C02F 1/68; C02F 1/70; C02F 1/01; C02F 1/72; C02F 2305/023; C02F 1/36; C08F 8/00
See application file for complete search history.

(56) References Cited

U.S. PATENT DOCUMENTS

2017/0217794 A1* 8/2017 Lipkens ................ B06B 1/0622

OTHER PUBLICATIONS

Araki, machine English translation of JP 2017-206592 (Year: 2017).*
Chen, machine English translation of CN 109929421 (Year: 2019).*
Song et al., machine English translation of CN 103421200 (Year: 2013).*
Wang et al., machine English translation of CN 209456226 (Year: 2019).*

* cited by examiner

*Primary Examiner* — Jessica M Roswell
(74) *Attorney, Agent, or Firm* — Matthias Scholl P.C.; Matthias Scholl (57) ABSTRACT

A method for activating a PTFE, the method including sonicating the PTFE using ultrasonic waves under a frequency of 20 kHz to 15 megahertz. Further provided is a method for electrogenesis, the method including: a) sonicating a polytetrafluoroethylene (PTFE) material using ultrasonic waves under a frequency of 20 kHz to 15 megahertz; b) connecting a positive electrode and a negative electrode to two opposite surfaces of the PTFE, respectively; and c) applying an external pressure on the positive electrode and the negative electrode.

10 Claims, 10 Drawing Sheets

FIG. 7

METHOD FOR ACTIVATING POLYTETRAFLUOROETHYLENE AND METHOD FOR WASTEWATER TREATMENT, ELECTROGENESIS, AND HYDROGEN PRODUCTION USING POLYTETRAFLUOROETHYLENE

CROSS-REFERENCE TO RELATED APPLICATIONS

This application is a continuation-in-part of International Patent Application No. PCT/CN2020/082740 with an international filing date of Apr. 1, 2020, designating the United States, now pending, and further claims foreign priority benefits to Chinese Patent Application No. 202010014724.7 filed Jan. 7, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of polytetrafluoroethylene (PTFE) material, and more particularly to a method for activating a PTFE and a method of using the PTFE for wastewater treatment, electrogenesis, and hydrogen production.

PTFE is a synthetic fluoropolymer of tetrafluoroethylene consisting wholly of carbon and fluorine. Conventionally, PTFE is widely used as an inert material in various fields such as machinery, road traffic, construction, medicine, aviation and navigation.

In recent years, nano or micro piezoelectric catalysts have been used in the treatment of environmental pollutants. The piezoelectric catalysts are mainly inorganic materials such as barium titanate, lead titanate, strontium titanate, lithium gallinate, lithium germanate, which are expensive and unstable in acids, bases, or organic solutions. PTFE used as a piezoelectric catalyst has not yet been reported.

SUMMARY

The disclosure provides a method for activating a PTFE by using ultrasonic waves. The activated PTFE forms an electret exhibiting the piezoelectric effect, and can be used for electrogenesis, hydrogen production and wastewater treatment.

The disclosure provides a method for activating a PTFE, the method comprising sonicating the PTFE using ultrasonic waves under a frequency of 20 kHz to 15 megahertz.

The frequency of the ultrasonic waves is in the range of 20 kHz to 15 megahertz.

Particularly, the frequency of the ultrasonic waves is in the range of 40 kHz to 1 megahertz.

The watt density of the ultrasonic waves is 0.1-400 $W/cm^2$.

Particularly, the watt density of the ultrasonic waves is 0.1-5 $W/cm^2$. Within a certain range, the intensity of the ultrasonic waves is proportional to the external pressure acting on the PTFE and the amount of deformation of the PTFE. The greater the amount of deformation, the better the piezoelectric performance of the material.

The PTFE is in the form of a granule, a thin film, a block, or a combination thereof. Under a constant quality, the smaller the size of the PTFE particles, the more the active sites, and the better the piezoelectric performance of the material.

The disclosure also provides a method for electrogenesis, the method comprising: a) sonicating a polytetrafluoroethylene (PTFE) material using ultrasonic waves under a frequency of 20 kHz to 15 megahertz; b) connecting a positive electrode and a negative electrode to two opposite surfaces of the PTFE, respectively; and c) applying an external pressure on the positive electrode and the negative electrode.

The PTFE is a thin film.

The thickness of the PTFE film is 10 nm-500 μm. The larger the thickness of the PTFE film, the stronger the structure of the PTFE film, which results in a small amount of deformation of the PTFE film in the presence of an external pressure, and a relatively small voltage is produced.

The external pressure applied on the PTFE film is 0-100 kPa. An excessive external pressure can destroy the structure of the PTFE film, make the film permanently lose the ability to restore to its original appearance, and lose the piezoelectricity.

The PTFE is treated with ultrasonic waves in air or water.

The disclosure also provides a method for hydrogen production, the method comprising: a) placing a PTFE in water, and sonicating the PTFE using ultrasonic waves under a frequency of 20 kHz to 15 megahertz, thereby producing hydrogen; and b) collecting the hydrogen.

The disclosure also provides a method for wastewater treatment by using PTFE, the method comprising: placing a PTFE in a wastewater, and sonicating the PTFE using ultrasonic waves under a frequency of 20 kHz to 15 megahertz, where an oxide and a reducer are produced, and the oxide oxidizes the pollutants and the reducer reduces the pollutants in the wastewater. The wastewater is domestic wastewater or industrial wastewater. The industrial wastewater is selected from printing and dyeing wastewater, pesticide wastewater, pharmaceutical wastewater, tannery wastewater and metallurgical wastewater.

The oxide comprises hydroxyl radical (.OH), superoxide (.$O_2^-$) and singlet oxygen ($^1O_2$), or a mixture thereof.

The reducer is an active hydrogen radical.

The addition amount of the PTFE is 10-2000 mg/L with respect to the wastewater. The PTFE is hydrophobic, so that excess PTFE may not be dispersed in the aqueous solution, thus preventing the influence of the piezoelectricity of the material.

PTFE is a perfluoropolymer resistant to high temperature and corrosion, has a low coefficient of friction, and is insoluble in strong acids, strong bases, and other organic solvents below 300° C.

Advantages of the method for activating a PTFE and a method of using the PTFE for wastewater treatment, electrogenesis, and hydrogen production are summarized as follows: the disclosure provides a method for activating a PTFE with ultrasonic waves. The activated PTFE transforms from an inert state to a polarized stat, thus exhibiting piezoelectric effect. When the ultrasonic waves are applied to the PTFE, the PTFE will generates multiple active species having oxidizing ability, such as positive hole ($h^+$), hydroxyl radical (.OH), superoxide (.$O_2^-$) and singlet oxygen ($^1O_2$), as well as multiple active species having reducing ability, such as electron ($e^-$) and active hydrogen radical (.H). Non-biodegradable pollutants are oxidized and reduced by the active species, achieving the objectives of removing the pollutants from domestic or industrial wastewater.

BRIEF DESCRIPTION OF THE DRAWINGS

FIG. 2B is a final state after ultrasonic treatment);

DETAILED DESCRIPTION OF THE EMBODIMENTS

To further illustrate the invention, embodiments detailing a method for activating a PTFE and a method of using the PTFE for wastewater treatment, electrogenesis, and hydrogen production are described below. It should be noted that the following embodiments are intended to describe and not to limit the disclosure.

The disclosure provides a method for activating a PTFE by using ultrasonic waves. The activated PTFE polarizes to form an electret exhibiting the piezoelectric effect, and can be used for electrogenesis. The activated PTFE can also be used for hydrogen production and wastewater treatment.

The disclosure provides a method for activating a PTFE, the method comprising sonicating the PTFE in air or water.

PTFE is an organic perfluoropolymer resistant to high temperature and corrosion, has a low coefficient of friction, and is insoluble in strong acids, strong bases, and other organic solvents below 300° C. Due to its physical and chemical properties, PTFE has been widely used in electronics, medicine, chemical industry, aerospace and other fields. The disclosure provides a method for activating PTFE with ultrasonic waves. The activated PTFE is polarized to form an electret having strong piezoelectricity.

Optionally, the ultrasonic equipment includes but is not limited to an ultrasonic cleaning machine, an ultrasound therapy machine and a cell disruption equipment. The operating parameters that influence ultrasonic activation include frequency, watt density and treatment time.

Optionally, the conditions of the ultrasonic treatment: the frequency of the ultrasonic waves is in the range of 20 kHz to 15 megahertz, and the watt density of the ultrasonic waves is 0.1 to 400 W/cm$^2$. Within a certain range, the intensity of the ultrasonic wave is proportional to the amount of deformation of the PTFE, that is, the greater the amount of deformation, the better the performance of the piezoelectric-catalysis.

The frequency of the ultrasonic waves is in the arrange of 40 kHz to 1 megahertz.

The watt density of the ultrasonic waves follows the formula: watt density=transmission power (W)/transmission area (cm$^2$). The watt density is 0.1-200 W/cm$^2$, particularly 0.1-50 W/cm$^2$, particularly 0.1-10 W/cm$^2$, and further particularly 0.1-5 W/cm$^2$.

Preferably, the frequency of the ultrasonic waves is in the range of 40 kHz to 1 megahertz, and the watt density of the ultrasonic waves is 0.1 to 5 W/cm$^2$. For example, the activation method is performed by the ultrasonic cleaning machine or the ultrasound therapy machine for arbitrary time. As long as the ultrasonic wave is applied to the PTFE, the free charge carriers are constantly produced, and the piezoelectric catalysis reaction continues.

Preferably, the PTFE is in the form of a granule, a thin film, a block, or a combination thereof. In a constant weight, the smaller the size of the PTFE micro powders, the more active sites, and the better the performance of the piezoelectric-catalysis.

Preferably, the granular PTFE with a shape comprises PTFE nanoparticles and PTFE micro powders which are between 0.1 nm-500 μm in diameter; the PTFE with a thin-film shape is 10 nm-50 μm in thickness; and the PTFE with a block shape is 0.01 cm$^3$-1 cm$^3$ in size.

The disclosure also provides a method for wastewater treatment and producing clean energy by using the activated PTFE. Specifically, a method for activating a PTFE and purifying wastewater comprises placing the PTFE in wastewater and sonicating the PTFE. The wastewater is domestic wastewater or industrial wastewater. The industrial wastewater is selected from printing and dyeing wastewater, pesticide wastewater, pharmaceutical wastewater, tannery wastewater and metallurgical wastewater. The clean energy production includes electrogenesis and hydrogen production.

The pollutants of the wastewater are degraded by the PTFE under the action of the ultrasonic waves, where multiple active species having strong oxidizing ability, such as positive hole ($h^+$), hydroxyl radical (.OH), superoxide (.$O_2^-$) and singlet oxygen ($^1O_2$) are produced. These active species exhibit strong oxidation effect on the domestic and industrial wastewater.

The PTFE can be a nanoparticle, a nanopowder, a microparticle, a micropowder, or a film. The amount of PTFE added in the wastewater is 10-2000 mg/L. The PTFE is hydrophobic, so that excess PTFE may not be dispersed in the aqueous solution, thus adversely affecting the piezo-electricity of the material.

In general, the pH of wastewater is 1-14. The PTFE is stable, and strong acids and bases hardly affect its catalytic activity.

The dissolved-oxygen concentrations of wastewater are 0-15 mg/L. The activated PTFE generates multiple active species having strong oxidizing ability, such as positive hole ($h^+$), hydroxyl radical (.OH), superoxide (.$O_2^-$) and singlet oxygen ($^1O_2$). The positive hole ($h^+$) is produced by PTFE itself during the reaction, and the hydroxyl radical (.OH) is produced from $OH^-$ or other free radicals in an intermediate stage, and the superoxide (.$O_2^-$) and singlet oxygen ($^1O_2$) are produced from $O_2$. The dissolved-oxygen in the wastewater has no effect on the piezoelectric catalytic reaction.

The activated PTFE not only produces the active species having strong oxidizing ability, but also produces multiple active species having strong reducing ability, such as electron ($e^-$) and active hydrogen radical (.H); two active hydrogen radical (.H) are recombined to form a molecule of hydrogen.

The dissolved-oxygen concentration of wastewater is 0-0.1 mg/L. If the wastewater contains excess oxygen, the active hydrogen radical (.H) reacts with the oxygen to form water, greatly reducing the production of hydrogen.

A method for activating a PTFE and producing oxygen, comprising: a) placing a PTFE in water, and sonicating the PTFE using ultrasonic waves under a frequency of 20 kHz to 15 megahertz, thereby producing hydrogen; and b) collecting the hydrogen.

Optionally, the water can be purified water, or wastewater produced from domestic or industrial activities, where the dissolved-oxygen concentrations of the wastewater is 0-0.1 mg/L.

A method for electrogenesis, the method comprising: a) sonicating a polytetrafluoroethylene (PTFE) material using ultrasonic waves under a frequency of 20 kHz to 15 megahertz; b) connecting a positive electrode and a negative electrode to two opposite surfaces of the PTFE, respectively; and c) applying an external pressure on the positive electrode and the negative electrode.

Figure 2A:
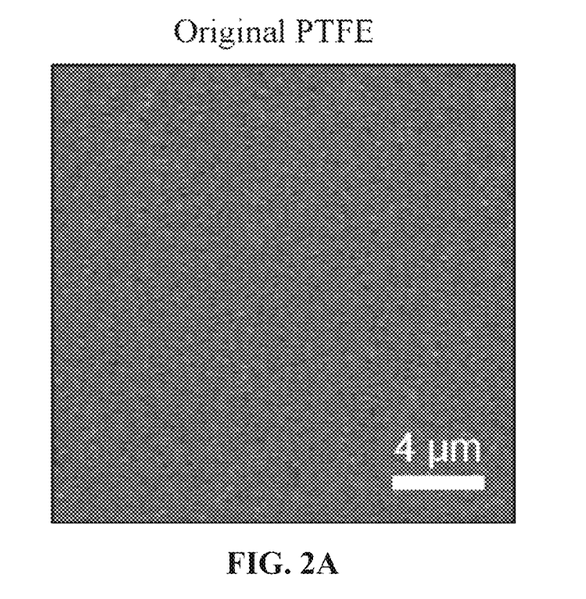
FIGS. 2A-2B are microscopy images of a PTFE before and after ultrasonic activation (FIG. 2A is an original state.
Figure 2B:
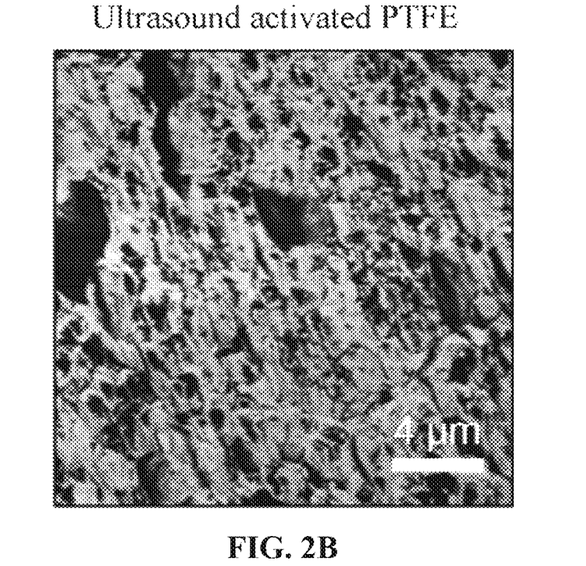

In addition to continuously produce free radicals during ultrasonic activation, the positive and negative charge centers of the dipoles of the PTFE have also changed. The positive and negative charge centers are symmetrical to each other prior to ultrasonic activation, but asymmetrical after ultrasonic activation, so that the PTFE is always in a polarization state. It can be seen from the microscopy image (FIGS. 2A-2B) that the ferroelectric domains are formed on the PTFE surface after ultrasonic treatment, indicating that PTFE is in a polarized state. But no ferroelectric domains are observed on the PTFE surface prior to ultrasonic treatment.

Figure 3:
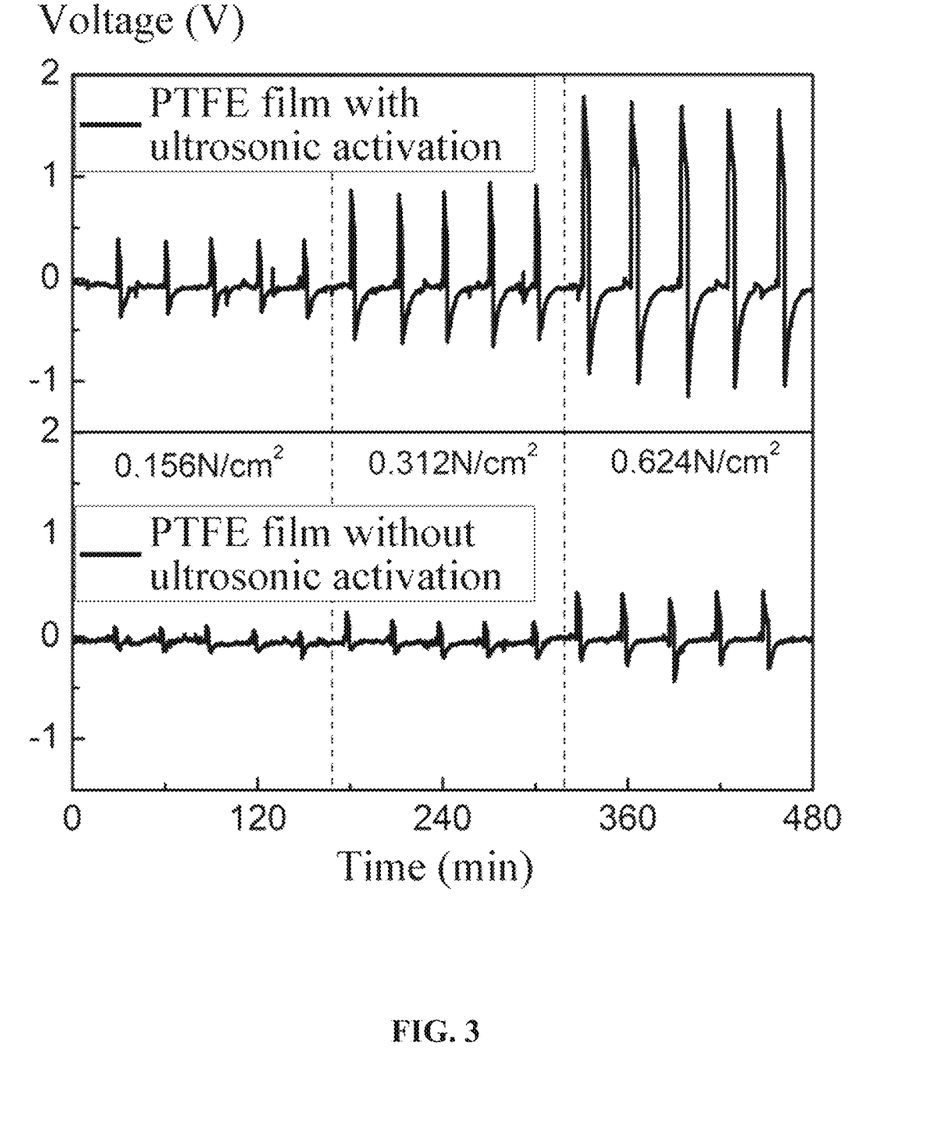
FIG. 3 is a diagram of electrogenesis of PTFE film with and without ultrasonic treatment.

When the activated PTFE is utilized as a piezoelectric material, a positive electrode and a negative electrode are connected to the two opposite surfaces of activated PTFE, respectively. The two electrodes are also connected to a voltage collection device. PTFE will undergo temporary deformation under a certain external pressure applied on the surface of the two electrodes. A voltage is thus detected on the PTFE surface thanks to the piezoelectric effect, as shown in FIG. 3.

Optionally, when the activated PTFE is used as a piezoelectric material for electrogenesis, the PTFE is preferably in a thin-film shape with a thickness of 10 nm-500 μm. The larger the thickness of the PTFE film, the stronger the structure of the PTFE film, which results in a small amount of deformation of the PTFE film in the presence of an external pressure, and a relatively small voltage is produced. Therefore, a thin, flexible PTFE film can exhibit relatively high-efficiency electrogenesis.

Optionally, the external pressure applied on the PTFE surface is 0-100 kPa. An excessive external pressure can destroy the structure of the PTFE film, make the film permanently lose the ability to restore to its original appearance, and lose the piezoelectricity.

The raw materials used in the examples are all commercially available products.

Example 1

Two round PTFE films with diameter of 2.5 cm and thickness of 100 μm, and 50 mL of 5 mg/L methyl orange (MO) were added to a 100-mL beaker. The beaker was placed in an ultrasonic cleaning machine where the watt density of the ultrasonic waves was 0.3 W/cm$^2$, and the frequency of the ultrasonic waves was 40 kHz. After ultrasonic treatment for 1 h, the absorbance of MO was measured. The results were shown in FIG. 1.

Comparative Example 1

Comparative Example 1 was the same as that in Example 1, except that no PTFE film was provided in the beaker. After ultrasonic treatment for 1 h, the absorbance of MO was measured. The results were shown in FIG. 1.

Figure 1:
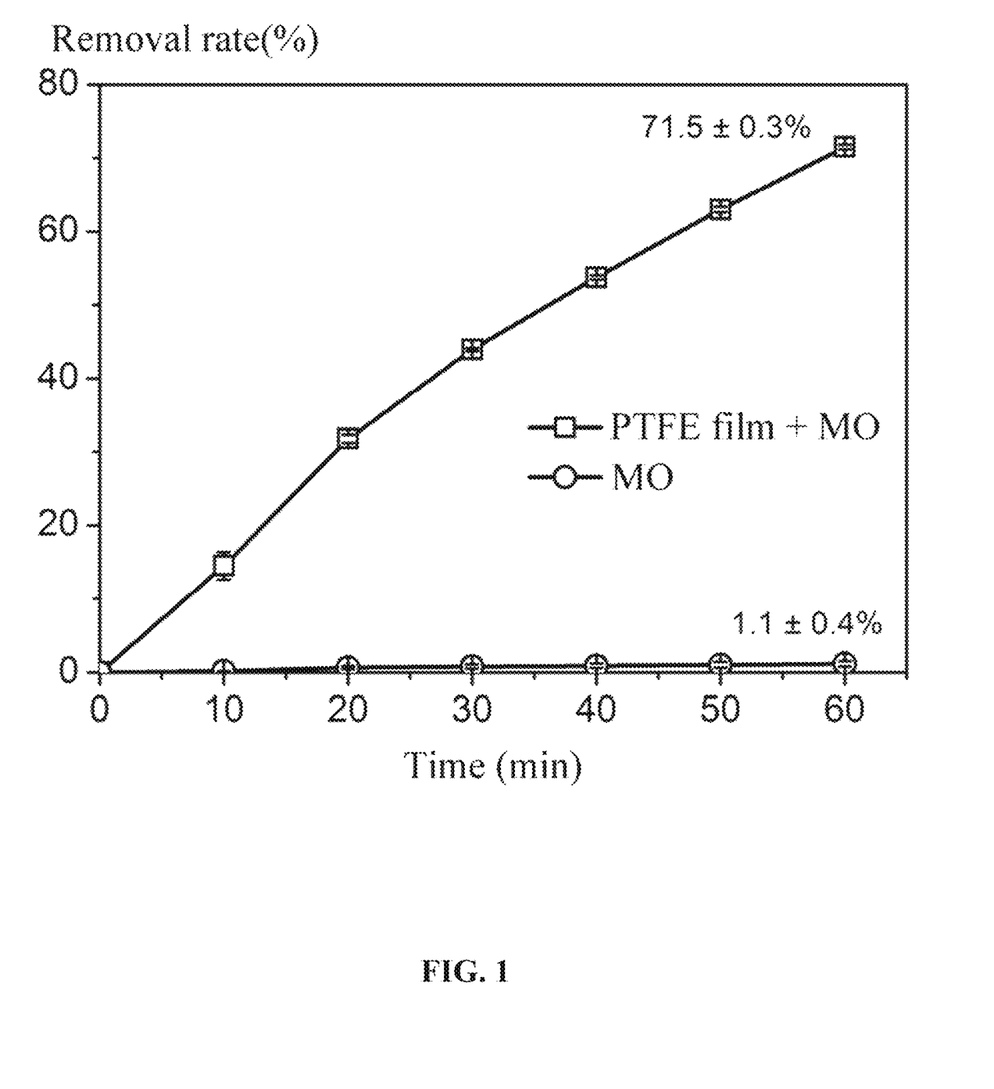
FIG. 1 is a schematic diagram of the degradation of methyl orange in the presence of a PTFE film and ultrasonic waves.

The results showed that the removal rate of methyl orange increased with the treatment time of the ultrasonic waves in the presence of PTFE film, but the removal rate was unchanged in Comparative Example 1 in the absence of PTFE film.

Example 2

A round PTFE film with a diameter of 2.5 cm and a thickness of 100 μm, and 50 mL of deionized water were added to a 100-mL beaker. The beaker was placed in an ultrasonic cleaning machine where the watt density of the ultrasonic waves was 0.3 W/cm$^2$, and the frequency of the ultrasonic waves was 40 kHz. After ultrasonic treatment for 1 h, the PTFE film was collected from the beaker and dried at 60° C. A piezoelectric force microscope was used to measure the polarization state of the PTFE film. The results were shown in FIG. 2B.

Comparative Example 2

Comparative Example 2 was the same as that in Example 2, except that the PTFE film was not processed with ultrasonic waves, and its polarization state was directly observed by the piezoelectric force microscope. The results were shown in FIG. 2A.

The results showed that the ferroelectric domains were formed on the PTFE surface after ultrasonic treatment (B), indicating that PTFE was in a polarized state. But no ferroelectric domains were observed on the PTFE surface prior to ultrasonic treatment (A).

Example 3

A square PTFE film with diameter of 3 cm and 50 mL of deionized water were added to a 100-mL beaker. The beaker was placed in an ultrasonic cleaning machine where the watt density of the ultrasonic waves was 0.3 W/cm$^2$, and the frequency of the ultrasonic waves was 40 kHz. After ultrasonic treatment for 1 h, the PTFE film was collected from the beaker and dried at 60° C. Two opposite surfaces of the PTFE film were connected to a copper mesh with an electrically conductive adhesive. The copper mesh was connected to a voltage collection device. Different external pressures were exerted on the PTFE film, and the voltage between two ends of the copper mesh was measured. The results were shown in FIG. 3.

Comparative Example 3

Comparative Example 3 was the same as that in Example 3, except that the PTFE film was not activated with ultrasonic waves. Different external pressures were exerted on the PTFE film, and the voltage between two ends of the copper mesh was measured. The results were shown in FIG. 3.

The results showed that under different external pressures, the performance of the electrogenesis of the PTFE film with ultrasonic treatment is much higher than that of PTFE film without ultrasonic treatment.

Example 4

Figure 4A:
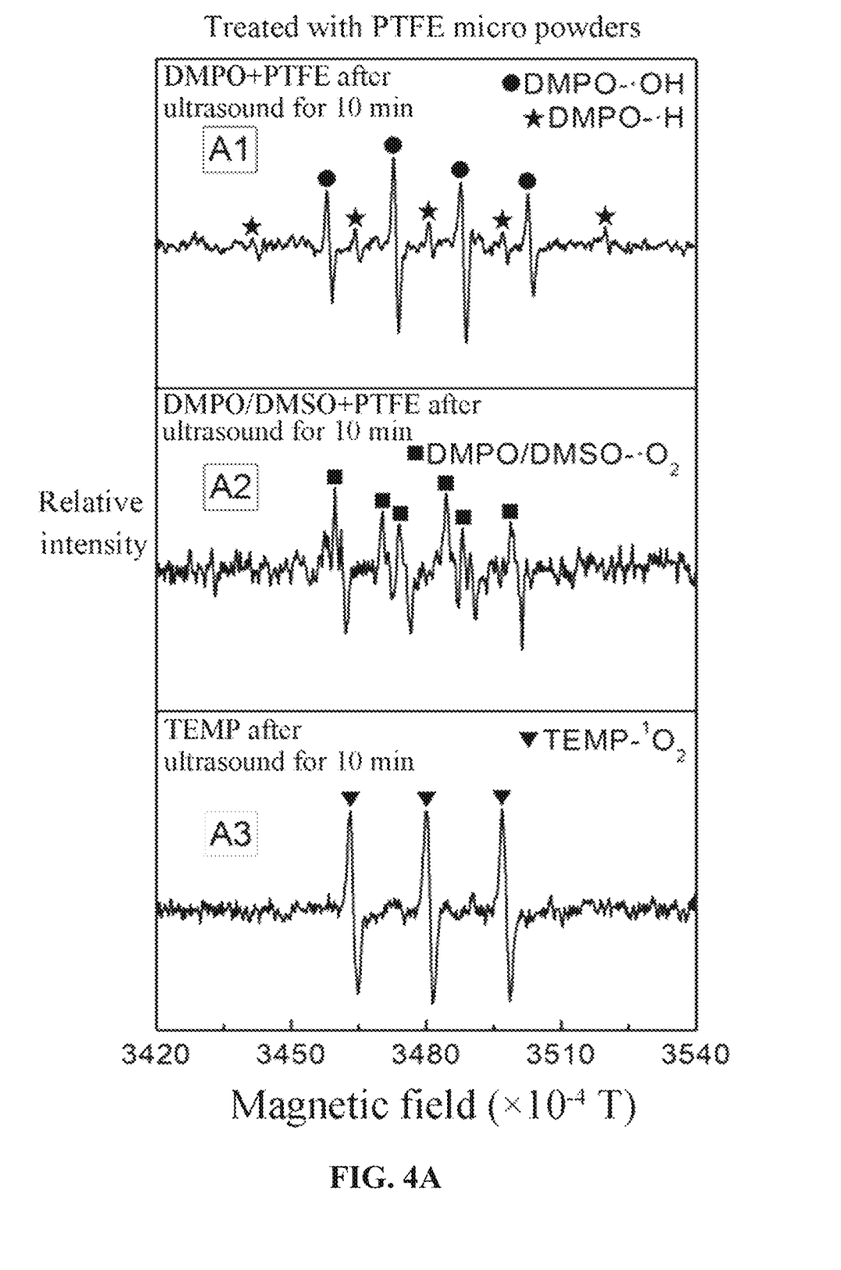
FIGS. 4A-4B are diagrams of radical intensity with and without PTFE micro powers with ultrasonic waves (FIG. 4A is a result after addition of PTFE micro powders, FIG. 4B is a result without PTFE micro powders)

0.5 mg of PTFE micro powders (with an average particle size of 5 μm), 450 of deionized water, and 50 μL of 1 mol/L 5,5-dimethyl-1-pyrroline N-oxide (DMPO) were added to a 1.5-mL centrifuge tube. The centrifuge tube was disposed in an ultrasonic cleaning machine where the watt density of the ultrasonic waves was 0.3 W/cm$^2$, and the frequency of the ultrasonic waves was 40 kHz, the treatment time of the ultrasonic waves was 10 min. An electron paramagnetic resonance instrument was used to detect the hydroxyl radical (.OH) during ultrasonic activation of PTFE. The results were shown in A1 of FIG. 4A.

Comparative Example 4

Figure 4B:
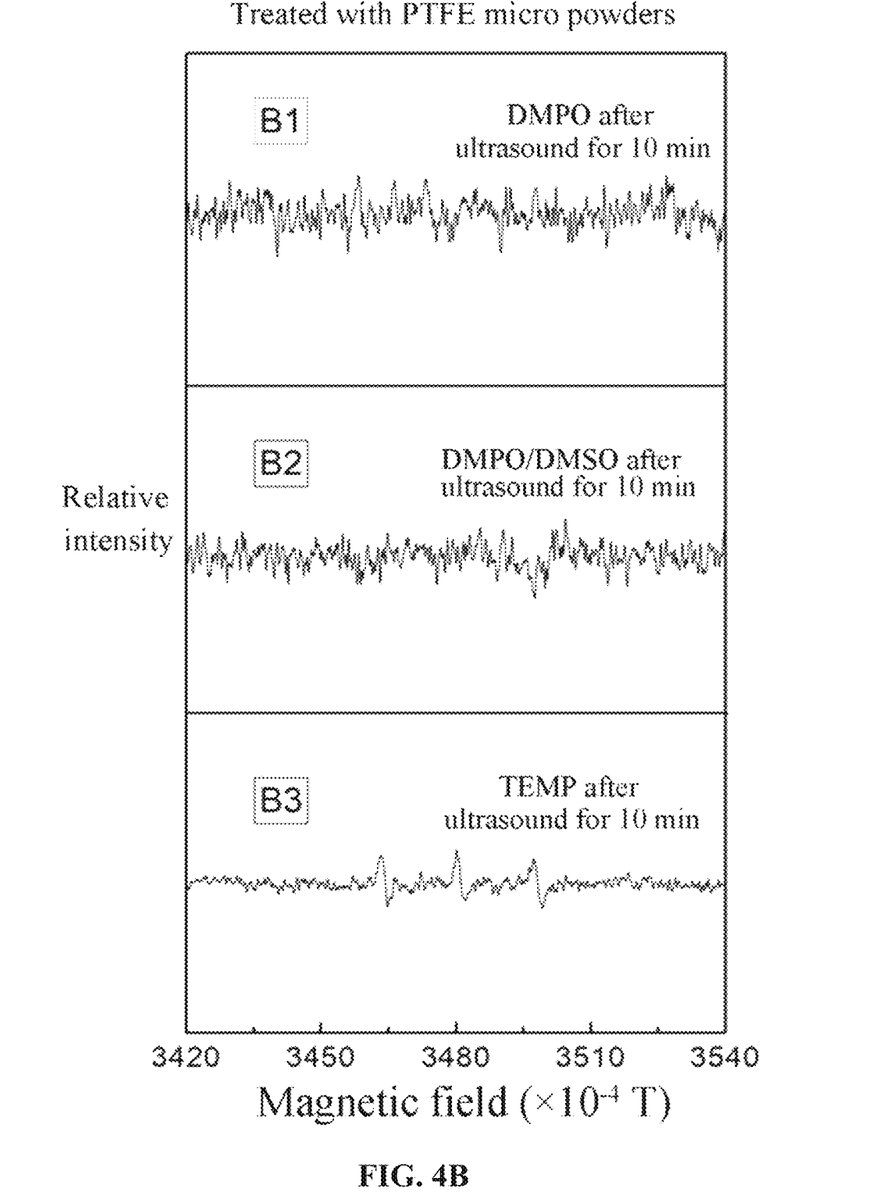

Comparative Example 4 was the same as that in Example 4, except that no PTFE micro powders was added to the centrifuge tube. After ultrasonic treatment for 10 min, the hydroxyl radical (.OH) was detected. The results were shown in B1 of FIG. 4B.

The results showed that the hydroxyl radical (.OH) was produced in the PTFE micro powders system under the ultrasonic waves, but not detected in the system without PTFE micro powders.

Example 5

0.5 mg of PTFE micro powders, 412.5 µL of deionized water, 50 µL of 1 mol/L 5,5-dimethyl-1-pyrroline N-oxide (DMPO), and 37.5 µL of dimethyl sulfoxide (DMSO) were added to a 1.5-mL centrifuge tube. The centrifuge tube was placed in an ultrasonic cleaning machine where the watt density of the ultrasonic waves was 0.3 W/cm$^2$, and the frequency of the ultrasonic waves was 40 kHz, the treatment time of the ultrasonic waves was 10 min. An electron paramagnetic resonance instrument was used to detect the superoxide (.$O_2^-$) during ultrasonic activation of PTFE. The results were shown in A2 of FIG. 4A.

Comparative Example 5

Comparative Example 5 was the same as that in Example 5, except that no PTFE micro powders was added to the centrifuge tube. After ultrasonic treatment for 10 min, the superoxide (.$O_2^-$) was detected. The results were shown in B2 of FIG. 4B.

The results showed that the superoxide (.$O_2^-$) was produced in the PTFE micro powders system under the ultrasonic waves, but not detected in the system without PTFE micro powders.

Example 6

0.5 mg of PTFE micro powders, 450 µL of deionized water, and 50 µL of 0.5 mol/L 2,2,6,6-tetramethyl-4-piperidinol (TEMP) were added to a 1.5-mL centrifuge tube. The centrifuge tube was placed in an ultrasonic cleaning machine where the watt density of the ultrasonic waves was 0.3 W/cm$^2$, and the frequency of the ultrasonic waves was 40 kHz, the treatment time of the ultrasonic waves was 10 min. An electron paramagnetic resonance instrument was used to detect the singlet oxygen ($^1O_2$) during ultrasonic activation of PTFE. The results were shown in A3 of FIG. 4A.

Comparative Example 6

Comparative Example 6 was the same as that in Example 6, except that no PTFE micro powders were added to the centrifuge tube. After ultrasonic treatment for 10 min the singlet oxygen ($^1O_2$) was detected. The results were shown in B3 of FIG. 4B.

The results showed that the singlet oxygen ($^1O_2$) was produced in the PTFE micro powders system under the ultrasonic waves, but not detected in the system without PTFE micro powders.

Example 7

Figure 5A:
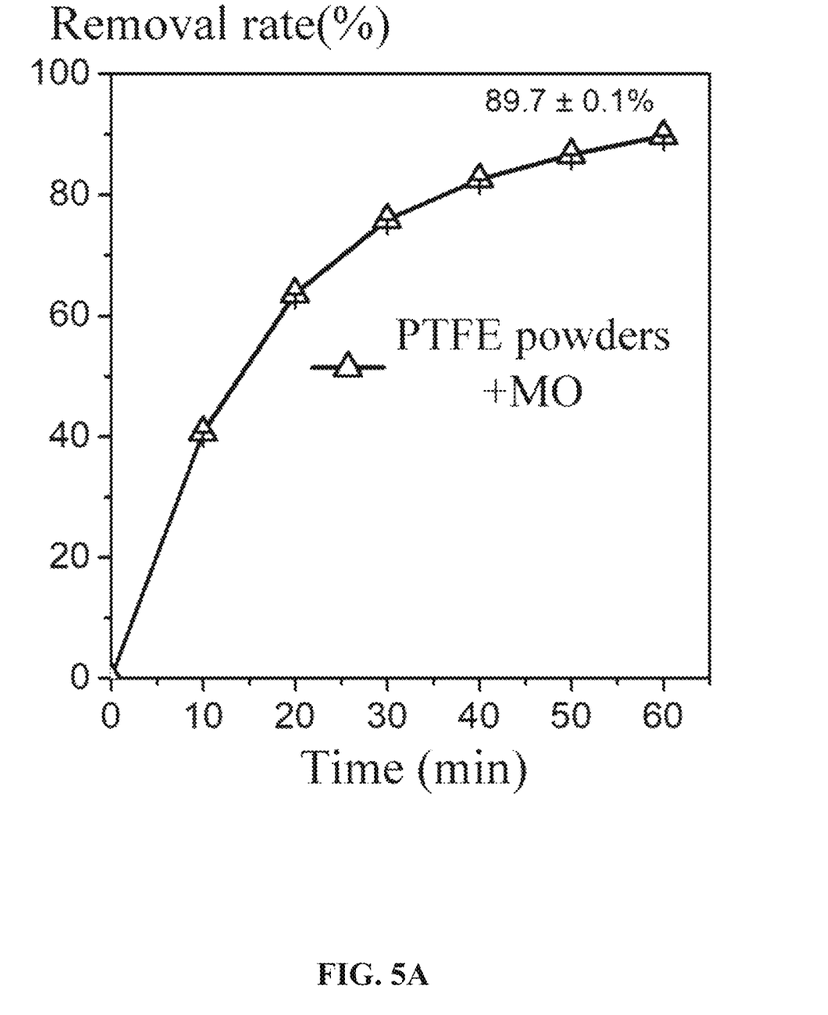
FIGS. 5A-5B are schematic diagrams of the degradation of methyl orange (FIG. 5A) and tetrachlorophenol (FIG. 5B) by PTFE micro powders under ultrasonic waves.

12.5 mg of PTFE micro powders and 50 mL of 5 mg/L methyl orange (MO) were added to a 100-mL beaker. The beaker was placed in an ultrasonic cleaning machine where the watt density of the ultrasonic waves was 0.3 W/cm$^2$, and the frequency of the ultrasonic waves was 40 kHz. After ultrasonic treatment for 1 h, the absorbance of MO was measured. The results were shown in FIG. 5A.

Comparative Example 7

Comparative Example 7 was the same as that in Example 7, except that no PTFE micro powders were added to the beaker. After ultrasonic treatment for 1 h, the absorbance of MO was measured. The results were the same to that of Comparative Example 1.

The results showed that the removal rate of methyl orange increased with the treatment time of the ultrasonic waves.

Example 8

50 mg of PTFE micro powders and 50 mL of 25 mg/L 2,3,4,6-tetrachlorophenol were added to a 100-mL beaker. The beaker was placed in an ultrasonic cleaning machine where the watt density of the ultrasonic waves was 0.3 W/cm$^2$, and the frequency of the ultrasonic waves was 40 kHz. After ultrasonic treatment for 1 h, the concentrations of 2,3,4,6-tetrachlorophenol and chloride ion were measured. The results were shown in FIG. 5B.

Comparative Example 8

Comparative Example 8 was the same as that in Example 8, except that no PTFE micro powders were added to the beaker. After ultrasonic treatment for 2 h, the concentrations of 2,3,4,6-tetrachlorophenol and chloride ion were measured, respectively. The results were shown in FIG. 5B.

Figure 5B:
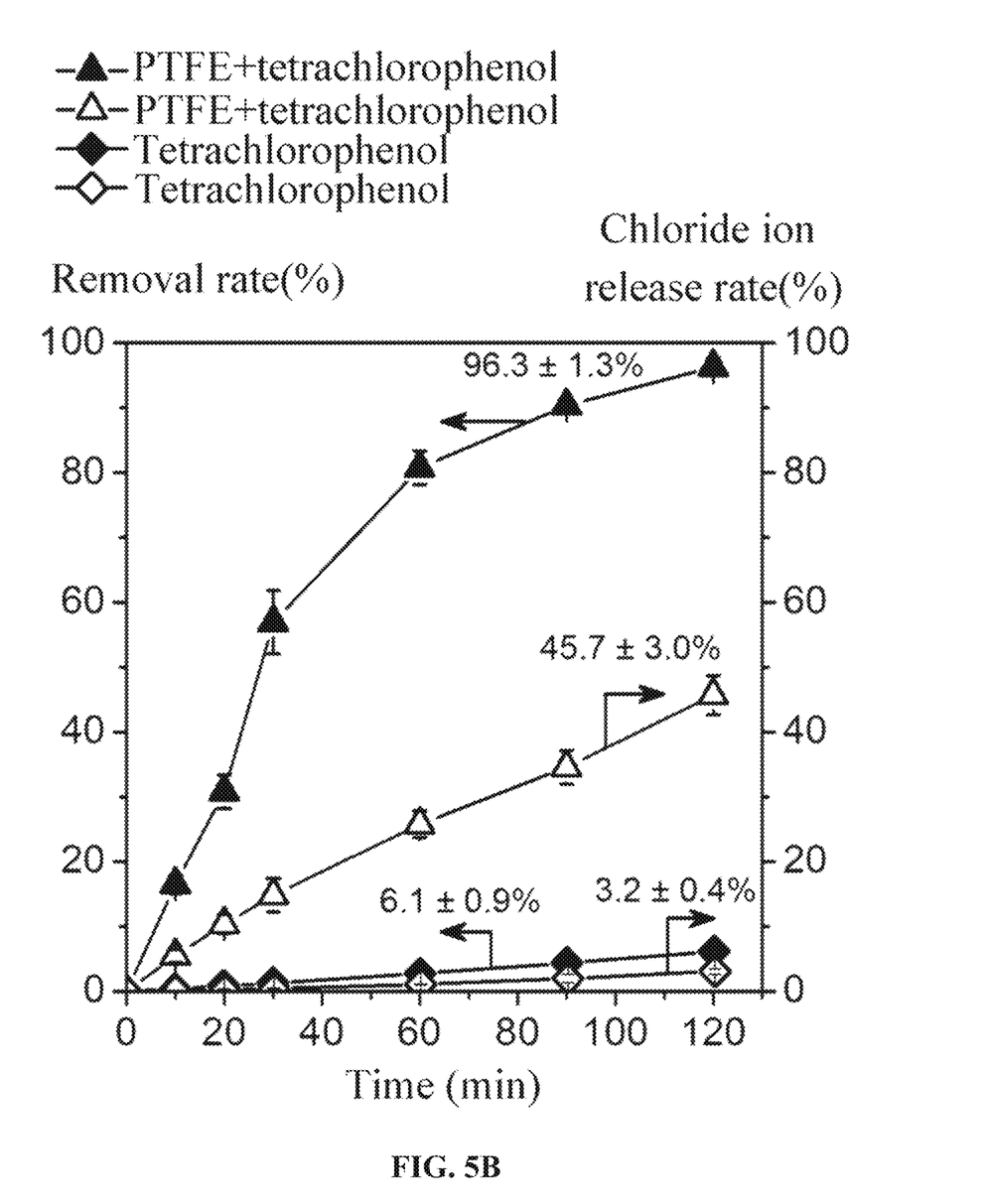

The results showed that after addition of PTFE micro powders, the removal rate of 2,3,4,6-tetrachlorophenol and the release rate of chloride ion increased with the treatment time of the ultrasonic waves, reaching 96.3% and 45.7%, respectively. But the removal rate of 2,3,4,6-tetrachlorophenol and the release rate of chloride ion reached only 6.1% and 3.2% in Comparative Example 8 without addition of PTFE micro powders.

Example 9

1 mL of a mixed solution containing 0.25 g/L PTFE micro powders and 5 mg/L methyl orange (MO) was transferred into a 10-mL test tube. The test tube was placed in an ultrasonic therapy machine where the watt density of the ultrasonic waves was 2.5 W/cm$^2$, the frequency of the ultrasonic waves was 1 megahertz, and the duty cycle was 30%. After ultrasonic treatment for 2 min, the absorbance of MO was measured. The results were shown in FIG. 6A.

Comparative Example 9

Comparative Example 9 was the same as that in Example 9, except that no PTFE micro powders were added to the test tube. After ultrasonic treatment for 2 min, the absorbance of MO was measured. The results were shown in FIG. 6A.

Figure 6A:
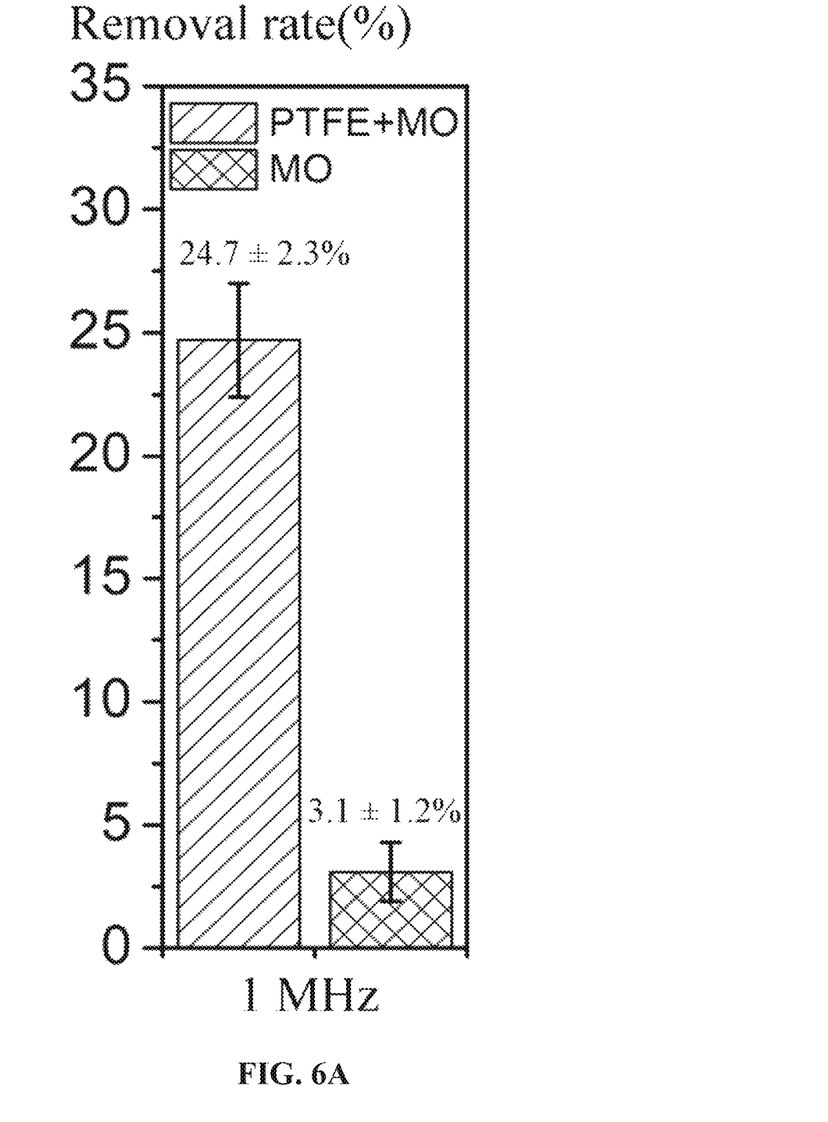
FIGS. 6A-6B are schematic diagrams of the degradation of methyl orange by PTFE micro powders with different high frequency ultrasounds.

The results showed that under the action of the ultrasonic waves at the frequency of 1 megahertz, more pollutants were removed from the PTFE micro powders system than the system without PTFE micro powders.

Example 10

1 mL of a mixed solution containing 0.25 g/L PTFE micro powders and 5 mg/L methyl orange (MO) was transferred into a 10-mL test tube. The test tube was placed on an ultrasound probe of an ultrasonic machine whose frequency of the ultrasonic waves was 8, 10 and 12 megahertz, respectively, the energy was 50%, and the pulse length was 2. The absorbance of methyl orange was measured after ultrasonic treatment for 10 min. The results were shown in FIG. 6B.

Comparative Example 10

Comparative Example 10 was the same as that in Example 10, except that no PTFE microplastics were added to the test tube. After ultrasonic treatment for 10 min, the absorbance of MO was measured. The results were shown in FIG. 6B.

Figure 6B:
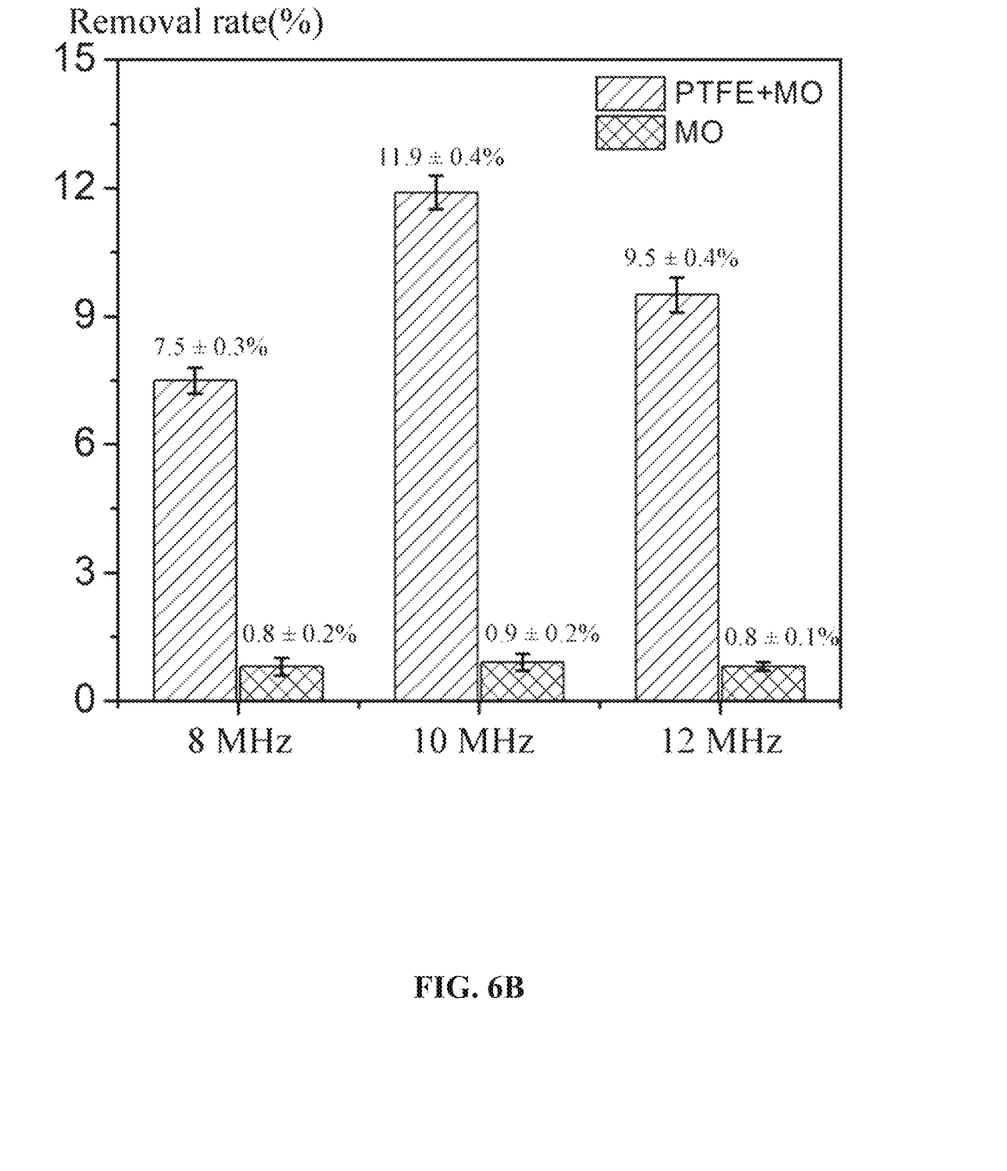

The results showed that under the action of the ultrasonic waves at the frequency of 8, 10, and 12 megahertz, respectively, more pollutants were removed from the PTFE micro powders system than the system without PTFE micro powders, illustrating that the PTFE also exhibited piezoelectric-catalysis under the high-frequency ultrasonic waves.

Example 11

Figure 7:
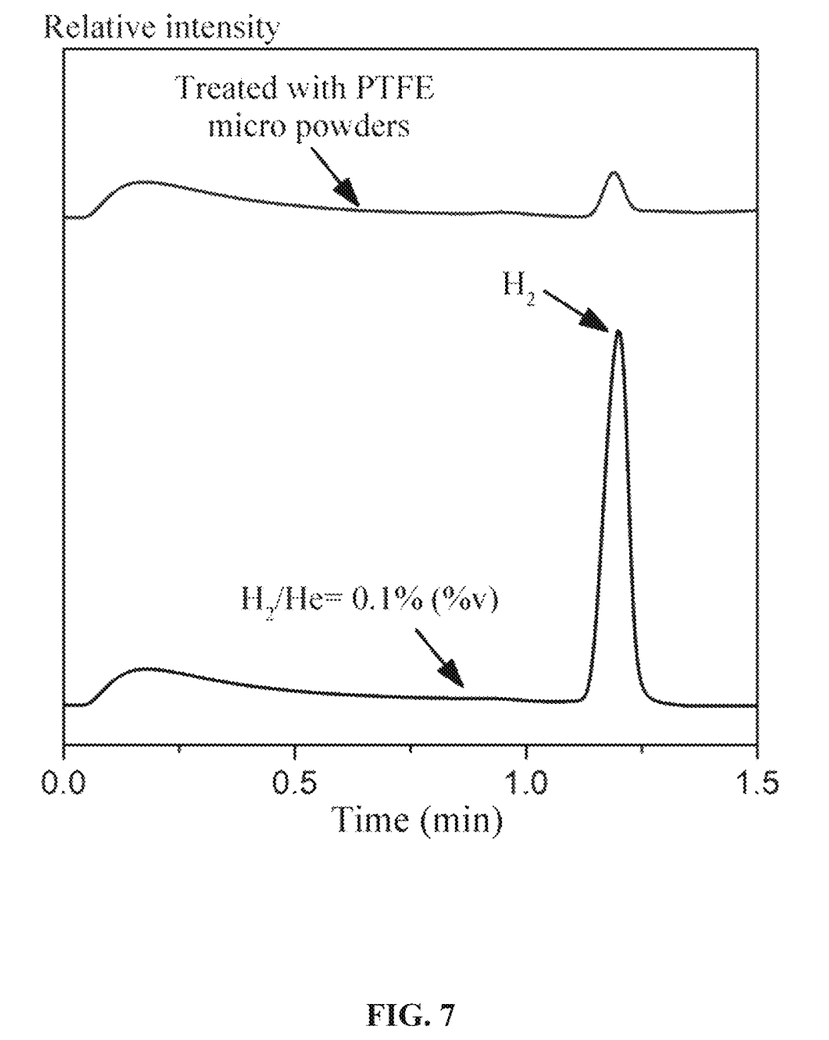
FIG. 7 is a graph of hydrogen production of PTFE micro powders with ultrasonic waves.

50 mL of deionized water and 50 mg of PTFE micro powders were added to a 100-mL reagent bottle, and argon gas was introduced therein (with a flow rate of 0.6 L/min) for 30 min. The reagent bottle was completely sealed and placed in an ultrasonic cleaning machine where the watt density of the ultrasonic waves was 0.3 W/cm$^2$, and the frequency was 40 kHz. After ultrasonic treatment for 2 h, the headspace gas was removed from the reagent bottle to determine the amount of hydrogen by a gas chromatography. The results showed that the amount of hydrogen was 2.23×10$^{-4}$ mmol. The results were shown in FIG. 7.

Comparative Example 11

Comparative Example 11 was the same as that in Example 11, except that no PTFE microplastics were added to the sealed reagent bottle. After ultrasonic treatment for 2 h, no hydrogen was detected.

The results of the above examples showed that in Example 1, the removal rates of methyl orange by the PTFE film reached 71.3±0.3%. In Examples 2-3, the ferroelectric domains can be seen clearly on the PTFE film after ultrasonic treatment compared to the PTFE film without ultrasonic treatment, and the voltage can be detected by applying a certain external pressure on the surface of the PTFE film.

In Examples 4-6, hydroxyl radical (.OH), superoxide (.$O_2^-$), singlet oxygen ($^1O_2$) and active hydrogen radical (.H) were produced during the activation of the PTFE micro powders under the ultrasonic waves. In Comparative Examples 4-6 (without addition of the PTFE micro powders), no hydroxyl radical (.OH), superoxide (.$O_2^-$), and active hydrogen radical (.H) were detected, and a small amount of the singlet oxygen ($^1O_2$) was detected. In Examples 7-8, the removal rates of methyl orange and 2,3,4,6-tetrachlorophenol under the action of the ultrasonic waves reached 89.7±0.01% and 96.3±1.3%, respectively. In Comparative Examples 4-6 without addition of PTFE micro powders, the removal rates of methyl orange and 2,3,4,6-tetrachlorophenol only reached 1.1±0.3% and 6.1±0.9%. In Examples 9-10, the PTFE micro powders can also be excited at megahertz frequencies to exhibit piezoelectric-catalysis. Compared with Comparative Example 11, the PTFE micro powders in Example 11 produced hydrogen under the action of the ultrasonic waves.

In summary, the PTFE was activated under the action of the ultrasonic waves, and produced multiple active species having strong oxidizing or reducing ability, which can be used to degrade and remove environmental pollutants.

It will be obvious to those skilled in the art that changes and modifications may be made, and therefore, the aim in the appended claims is to cover all such changes and modifications.

What is claimed is:

1. A method for electrogenesis, the method comprising: a) sonicating a PTFE using ultrasonic waves under a frequency of 20 kHz to 15 megahertz; b) connecting a positive electrode and a negative electrode to two opposite surfaces of the PTFE sonicated in a), respectively; and c) applying an external pressure on the positive electrode and the negative electrode.

2. The method of claim 1, wherein the PTFE is a thin film.

3. The method of claim 2, wherein a thickness of the PTFE film is 10 nm-500 μm.

4. The method of claim 3, wherein the external pressure applied on the PTFE film is in the range of 0-100 kPa.

5. The method of claim 1, wherein the PTFE is sonicated in air or water.

6. A method for hydrogen production, the method comprising: a) placing a PTFE in water, and sonicating the PTFE using ultrasonic waves under a frequency of 20 kHz to 15 megahertz according to the method of claim 1, thereby producing hydrogen; and b) collecting the hydrogen.

7. A method for wastewater treatment, the method comprising: placing a PTFE in a wastewater, and sonicating the PTFE using ultrasonic waves under a frequency of 20 kHz to 15 megahertz, where an oxide and a reducer are produced, and the oxide oxidizes the pollutants and the reducer reduces the pollutants in the wastewater.

8. The method of claim 7, wherein the oxide comprises hydroxyl radical (.OH), superoxide (.$O_2^-$) and singlet oxygen ($^1O_2$), or a mixture thereof.

9. The method of claim 7, wherein the reducer is an active hydrogen radical (.H).

10. The method of claim 7, wherein an addition amount of the PTFE is 10-2000 mg/L with respect to the wastewater.

* * * * *